United States Patent [19]
Perla et al.

[11] 3,919,409
[45] Nov. 11, 1975

[54] NOVEL DENTIFRICE COMPOSITION

[75] Inventors: Giulio Perla; Giuseppe Mannara, both of Rome, Italy

[73] Assignee: Colgate-Palmolive Company, New York, N.Y.

[22] Filed: Nov. 16, 1972
(Under Rule 47)

[21] Appl. No.: 307,299

[30] Foreign Application Priority Data
Nov. 17, 1971    Italy................................. 54148/71

[52] U.S. Cl.................................... 424/52; 424/49

[51] Int. Cl.²...................... A61K 7/16; A61K 7/18
[58] Field of Search.............................. 424/49-58, 424/52

*Primary Examiner*—Richard L. Huff
*Attorney, Agent, or Firm*—Robert L. Stone; Herbert S. Sylvester; Murray M. Grill

[57]    ABSTRACT

Particulate material containing matrix of glyceryl or ethylene glycol di- or tri-ester of a $C_{12}$ to $C_{22}$ saturated fatty acid and a dentifrice component and dentifrice containing speckles of such particulate material.

11 Claims, No Drawings

NOVEL DENTIFRICE COMPOSITION

This invention relates to novel particulate materials, to dentifrice compositions containing same and to the method of preparing said materials and compositions.

Uniformly colored as well as speckled dentifrices are known with the latter being of particular aesthetic appeal. In addition to non functional speckles, functional speckles, particularly of dental polishing agents are also known.

The present invention is directed to the provision of unique and novel speckles which are admirably suited for use in dentifrices, powders as well as pastes, and which may or may not, as desired, be functional, which are readily prepared and which are not only safe orally but which are safe when ingested.

The speckles of the present invention comprise a matrix of a glyceryl di- or tri ester of a $C_{12}$ to $C_{22}$ saturated fatty acid having incorporated therewith or therein any suitable material which is a normal component of a dentifrice of any which may desire to incorporate into a dentifrice for an esthetic or functional purpose. In addition to glyceryl esters one may also use the ethylene glycol di-esters.

The material which may be used with the glyceryl ester may be a liquid, soluble or insoluble in the ester or a solid in finely divided form. The liquids and solids may be colored or colorless as desired. The preferred materials are finely divided solids which may be white or colored, the coloring agent having a particle size less than $2\mu$ and preferably less $1\mu$. Among suitable solids are the conventional water-insoluble polishing agents which include insoluble phosphate salts, such as insoluble sodium metaphosphate, insoluble potassium metaphosphate, calcium pyrophosphate, magnesium ortho-phosphate, trimagnesium orthophosphate, tricalcium phosphate, dicalcium phosphate di-hydrate, anhydrous dicalcium phosphate and the like. Other polishing agents include calcium carbonate, magnesium carbonate, hydrated alumina, silica, zirconium silicate, aluminum silicate including calcined aluminum silicate and polymethyl methacrylate. Combinations of polishing agents may also be employed; water-insoluble colouring matter i.e. pigments, preservatives, brightening agents, ammoniated materials, e.g. urea, diammonium phosphate, anti-bacterial agents, flavorings and fluorine-containing compounds having a beneficial effect on the oral hygiene of the oral cavity e.g., sodium and potassium fluoride, stannous fluoride, stannous chlorofluoride, sodium hexafluorostannate, potassium stannous fluoride ($SNF_2.KF$), sodium fluorozirconate and sodium monofluorophosphate; surface active agents; etc.

Generally the glyceryl ester matrix will comprise the major portion of the speckles, particularly when they are primarily non-functional, such as from about 50 to 99% by weight of the speckles. With functional additives the glyceryl ester matrix will generally range from about 1 to 99.99% by weight with lesser quantities indicated particularly where the functional ingredient is a polishing agent.

In order to obtain the desired speckled effect it is necessary that the speckles be of macroscopic size (i.e. visible) and generally in the range of about 100 to 1000 microns, preferably 200 to 600 microns and most preferably about 250 to 500 microns. Because of the unique physical and chemical characteristics, i.e. softening point and/or melting point, hardness compatibility, etc. of the glyceryl esters used in this invention, the maximum size of the speckles in the dentifrices is not nearly as critical as that of previously suggested products for this purpose.

The amount of speckles in the oral compositions of this invention may range from 0.01% to 50% by weight or more preferably from 0.02% to 20% and more preferably 0.05 to 10% by weight of the oral compositions.

The particle size of the solids to be incorporated into and/or with the glyceryl ester must be sufficiently small, generally less than about 200 microns, so as not to feel "gritty" in the mouth. The polishing agents as conventionally used have particle sizes less than about 100 microns and generally less than 75 microns. Other solids, particularly pigments, should have a particle size less than about 200 microns, also; the glyceryl esters used in this invention are generally characterized as soft fatty substances with suitable melting points ranging from about 40°C to 80°C and preferably 45°C to 70°C. Mixtures of esters, conforming to the specifications, are of course, suitable as well.

The speckles of this invention are most conveniently prepared by liquefying the ester and then incorporating the desired additive therewith. The resulting admixture may then be sprayed-cooled to give varying particle sizes depending upon the spray pattern characteristics, pressure of spraying, cooling conditions e.g. temperature of cooling gas, velocity of gas, etc. Suitable conditions merely illustrative, are cooling gas at room temperature, air pressure 2 – 10 atmospheres, etc.

The mixture of ester and additive may also be cooled on a chilled mill roll and recovered in finely divided form in the usual manner. It is preferred to employ spray-cooling since a homogeneous and uniformly sized product can be obtained with the desired particle size more readily controllable.

Suitable coloring agents for the speckles, including white, may be selected from any dye or pigment and, while it is preferred to use water-insoluble colors, it has been unexpectedly found that water-soluble dyes, particularly those certified for use in food, can also be used, are stable in the speckles and do not "bleed" into the main body of the toothpaste. Where the coloring agent is a finely divided solid it is imperative that the particles have an average particle size of less than $2\mu$ and preferably less than $1\mu$ with the maximum particle size not exceeding $5\mu$. It is indeed surprising that with such a small particle size there is no bleeding of the colorant into the main body of the toothpaste and one possible explanation for this unique performance is in the fact that the particles are in such a fine state of subdivision and so homogeneously distributed through the ester matrix that only very small quantities i.e. low concentrations 0.1 to 2% and preferably 0.2 to 1% are necessary to give an acceptable color density to the speckle. Illustrative materials include titanium dioxide, calcium carbonate, calcium sulfate, food certified dyes of the following Color Index numbers: (1249a) 75120, 75130, 75810, 69800, 42051, 75470, 1758, 14720, 16185, 15985, 15980, 75300, 19140, 44270.

Others include Pigment Red 5 (15490), Pigmosol Carmine G, Pigmosol Green GN, Pigmosol Blue B, Irgalite Carmine FB, Viscofil Green 2 GL and Fenalac Blue B.

In addition to the solid colorants, one may use liquid colorants, such as azulene and the like.

As pointed out above the dentifrice may be a powder but preferably a paste which may be opaque, translucent or transparent. Such pastes contain a dental vehicle which forms a gel or creamy mass of consistency which can be desirably extruded from a collapsible tube, such as an aluminum, lead or plastic tube. The vehicle contains liquids and solids.

In general, the liquid portion comprises water, glycerine, sorbitol, propylene glycol, polyethylene glycol 400 or the like including mixtures thereof. It is usually advantageous to use a mixture of both water and a humectant, such as glycerine, sorbitol, propylene glycol or the like. The total liquid content is generally about 20–89.5% by weight of the toothpaste. In transparent and translucent toothpastes the liquid content of the toothpaste may be about 20–89.5% by weight while in opaque toothpastes the total liquid content is usually about 20–50%.

The solid portion of the vehicle is a gelling agent, such as the natural and synthetic gums and gum-like materials, such as Irish Moss, tragacanth, alkali metal carboxymethylcellulose and hydroxymethyl carboxyethyl cellulose, polyvinyl pyrrolidone, starch, water soluble, hydrophilic colloidal carboxyvinyl polymers such as those sold under the trademark Carbopol 934 and 40, and silica aerogels. The solid portion of the vehicle is typically present in an amount up to about 10% by weight of the toothpaste and preferably about 0.5–5% by weight.

In addition to the above, the base dentifrice generally contains water-soluble invisible polishing agent having a particle size typical of that employed in the prior art, such as less than about 74 microns.

The dentifrice base may also contain surface-active agent in addition to any such agent as may be present in the speckles. It is preferred that the total amount of surface-active agent, including such agent as may be in the speckles, be about 0.05% by weight, preferably about 1–3%, of the dentifrice.

Various other materials may be incorporated in the oral preparation of this invention. Examples thereof are coloring or whitening agents, preservatives, silicones, chlorophyll compounds, ammoniated materials, such as urea, diammoniumphosphate and mixtures thereof, and other constituents. Each of these adjuvants may be typically incorporated in the instant toothpastes in amounts up to about 5%. Where coloring is employed the speckles may be colored with a suitable contrasting color.

Additional materials which may be used include titanium dioxide and allanboin in amounts from about 0.01% to about 10%.

The toothpaste may also contain antibacterial agents in amounts of about 0.01–5%. Typical examples of such agents are guanidines, biguanides and amines such as:

$N^1$-(4-chlorobenzyl)-$N^5$-2,4-dichlorobenzyl) biguanide;
p-chlorophenyl biguanide;
4-chlorobenzyhydryl biguanide;
4-chlorobenzhydrylguanylurea;
n-3-lauroxypropyl-$N^5$-p-chlorobenzylbiguanide;
1,6-di-p-chlorophenylbiguanidohexane;
1-(lauryldimethylammonium)-8-(p-chlorobenzyldimethylammonium) octane dichloride;
5,6-dichloro-2-guanidinobenzimidazole;
$N^1$-p-chlorophenyl-$N^5$-laurylbiguanide;
5-amino-1,3-bis(2-ethylhexyl)-5-methylhexahydropyrimidine; and their non-toxic acid addition salts.

Suitable flavoring or sweetening sialagogues may be employed in formulating a flavor for the compositions of the present invention. Examples of suitable flavoring constituents include the flavoring oils, e.g., oils of spearmint, peppermint, wintergreen, sassafras, clove, sage, eucalyptus, marjoram, cinnamon, lemon and organge, as well as sodium methysalicylate. Suitable sweetening agents include sucrose, lactose, maltose, sorbitol, sodium cyclamate and saccharine. Suitably, flavor and sweetening agent may together comprise from about 0.01 to 5% or more of the compositions of the instant invention.

The compositions of the present invention suitably may also contain a fluorine-containing compound having a beneficial effect on the care and hygiene of the oral cavity, e.g., diminution of enamel solubility in acid and protection of the teeth against decay. Examples thereof include sodium fluoride, stannous fluoride, potassium fluoride ($SnF_2.KF$), sodium hexafluorostannate, stannous chlorofluoride, sodium fluorozirconate and sodium monofluorophosphate. These materials, which dissociate or release fluorine-containing ions in water, suitably may be present in an effective but non-toxic amount, usually within the range of about 0.01 to 1% by weight of the water soluble fluorine content thereof.

The most preferred speckles of the present invention are prepared from glyceryl tristearate containing from about 0.05% to about 10% by weight coloring material with a range of 0.5% to 2% by weight preferred. Suggested ranges for some of the functional additives to the speckle are: polishing agent −1 to 75%, preferred 5 to 50%; fluorides 0.01–50%; preferred 0.01–20%; preservatives 0.01–50%; antibacterial agents 0.01–50%; flavors 0.01–50%.

The following examples will serve to illustrate the present invention without being deemed limitative thereof. Amounts, proportions and parts described in these examples are by weight unless otherwise indicated.

EXAMPLE 1

2000 parts of glyceryl tristearate are melted in a suitable vessel and thereafter poured over Mazzoni pilot 3-roll mill through which water at water at room temperature is circulating. The solidified ester is scraped off the mill, then put into a granulator, then to a vibrating sieve to yield product of from 40 to 60 mesh (250 to 420 microns).

EXAMPLE 2

Example 1 is repeated except that the particles are sieved to yield product of from 420 to 840 microns, using 20 to 40 mesh screening.

EXAMPLE 3

Examples 1 and 2 are repeated using the following esters:
A. Glyceryl distearate
B. Glyceryl tripalmitate
C. Glyceryl trilaurate
D. Glyceryl tri-docosylate
E. Glycol distearate

EXAMPLE 4

Examples 1 to 3 are repeated except that in each instance the following coloring materials are added to the liquefied ester:

a. 0.5% Pigment Red 5
b. 1.0% Pigment Red 5
c. 2.0% Pigment Red 5
d. 1.0% Azulene
e. 2.5% Azulene
f. 0.3% C.I. 75120
g. 0.6% C.I. 75810
h. 0.1% C.I. 75470
i. 0.8% C.I. 19140
j. 0.5% C.I. 75130
k. 0.3% C.I. 69800
l. 0.5% Pigmosol Carmine G
m. 0.5% Viscofil Green GL The pigments used in this Example all have an average particle size of less than $2\mu$.

EXAMPLE 5

Examples 1 to 3 are again repeated adding to the ester in liquid form the following:

A. 2.0% titanium dioxide
B. 3.0% Calcium carbonate
C. 20.0% titanium dioxide
D. 50.0% Calcium carbonate
E. 5.0% Sodium fluoride
F. 8.0% Sodium monofluorophosphate
G. 60.0% Dicalcium phosphate dihydrate average particle size 4.2 microns
H. 5.0% Sodium benzoate
I. 25.0% Zircons silicate
J. 35.0% Hydrated alumina
K. {60.0% Dicalcium phosphate dihydrate
   {1.5% Azulene
L. {50.0% Hydrated alumina
   {0.8% Pigment Red 5
M. {40.0% Zirconium silicate
   {0.5% Pigment C.I. 75130

EXAMPLE 6

A translucent toothpaste having the following formulation:

| Water | 81.00% |
| Methyl Parahydroxybenzoate | 0.15% |
| Propyl Parahydroxybenzoate | 0.15% |
| Sodium Saccharin | 0.20% |
| Glycerine | 10.00% |
| Carbopol 940 | 2.00% |
| Sodium Lauryl Sulfate | 1.50% |
| Sodium Hydoxide Solution (10%) | 5.00% | is prepared. Into the formulation there is incorporated 3% by weight of the speckles of Example 5(L) prepared from glyceryl tristearate of 250 to 420 microns.

EXAMPLE 7

Example 6 is repeated using the red pigmented glyceryl tristearate of 420 to 840 microns.

EXAMPLE 8

Examples 6 and 7 are repeated using the glyceryl tristearate speckles of 5(K) of both sizes as prepared in Examples 1 and 2.

EXAMPLE 9

Example 8 is repeated except the speckles are glyceryl tristearate containing 0.5% pigment C.I. 75130 and Zirconium silicate (Example 5(M)).

EXAMPLE 10

Examples 6 and 7 are again repeated except that the red speckles are based on the following:
a. Glyceryl distearate
b. Glyceryl tripalmitate

EXAMPLE 11

The following transparent formulation is made:

| Glycerine | 10.00% |
| Sodium Carboxymethyl Cellulose | 2.00% |
| Sodium Benzoate | 0.50% |
| Sodium Saccharin | 0.20% |
| Sodium Lauryl Sulfate | 2.50% |
| Color | 0.10% |
| Ethanol (95%) | 10.00% |
| Flavor | 1.30% |
| Sorbitol Solution (70%) | 73.40% |

Into the above formulation there are separately incorporated the following speckles in the amounts indicated:

A) 5% Example 5(K) Glyceryl tristearate 250–420 microns($\mu$)
B) 5% Example 5(K) Glyceryl tristearate 420–840$\mu$
C) 5% Example 5(L) Glyceryl tristearate 250–420$\mu$
D) 5% Example 5(L) Glyceryl tristearate 420–840$\mu$
E) 5% Example 5(L) Glyceryl tristearate 250–420$\mu$
F) 3% Example 5(M) Glyceryl tristearate 250–420$\mu$

EXAMPLE 12

An opaque toothpaste of the following formulation is prepared:

| Glycerine (99.3%) | 19.950% |
| Sodium Carboxymethyl Cellulose | 0.850% |
| Sodium Saccharin | 0.200% |
| Sodium Benzoate | 0.500% |
| Tetrasodium Pyrophosphate | 0.250% |
| Water | 19.986% |
| Trimagnesium Phosphate | 0.200% |
| Calcium Carbonate | 5.00% |
| Dicalcium Phosphate Dihydrate | 46.550% |
| Sodium N-Lauroyl Sarcosinate (35%) | 5.714% |
| Flavor | 0.800% |

To this formulation these are separately added the following speckles:

A) 2% 4(A) Glyceryl tristearate 250–420$\mu$
B) 3% 4(D) Glyceryl tristearate 250–420$\mu$
C) 1% 4(A) Glyceryl tristearate 420–840$\mu$
D) 1% 4(D) Glyceryl tristearate 420–840$\mu$
E) 1% 4(J) Glyceryl tristearate 250–420$\mu$

EXAMPLE 13

The following opaque toothpaste is prepared:

| | % |
|---|---|
| Glycerine (98% CP) | 6.12 |
| Sodium Carboxymethyl Cellulose 7MF | 1.00 |
| Sodium Benzoate | 0.50 |
| Saccharin | 0.12 |
| Tetrasodium pyrophosphate | 0.30 |
| Sorbitol (70% aq. solution) | 16.00 |
| Deionized water | 24.91 |
| Calcium Carbonate | 8.00 |

-continued

| | % |
|---|---|
| Dicalcium phosphate dihydrate | 40.00 |
| Sodium N-Lauroyl Sarcosinate | 2.05 |
| Flavor | 0.80 |
| | 100.00% |

The following speckles are separately incorporated in the amounts indicated:

| A) | 0.5% 4(A) | Glyceryl tristearate | 240–420μ |
| B) | 0.5% 4(D) | Glyceryl tristearate | 250–420μ |
| C) | 0.5% 4(A) | Glyceryl tristearate | 250–420μ |
| D) | 0.5% 4(J) | Glyceryl tristearate | 420–840μ |
| E) | 0.5% 4(D) | Glyceryl tristearate | 420–840μ |
| F) | 0.5% 4(J) | Glyceryl tristearate | 420–840μ |

EXAMPLE 14

The following clear gel dentifrice formulation containing abrasive polishing agent is prepared:

| | Parts |
|---|---|
| Glycerine | 24.80 |
| Sodium Carboxymethyl Cellulose | 1.00 |
| Saccharin | 0.11 |
| Sodium benzoate | 0.50 |
| Sorbitol-70% aq. solution | 44.90 |
| Deionized water | 3.60 |
| Syloid 244 (silica thickener) | 5.00 |
| Sodium aluminum silicate P-820 (polishing agent) | 16.00 |
| Sodium lauryl sulfate | 2.00 |
| Flavor | .90 |

The same speckles used in Example 13 are used here too.

EXAMPLE 15

The following clear gel dentifrice formulation containing sodium aluminum silicate polishing agent is prepared:

| | Parts |
|---|---|
| Sorbitol (70% aq. solution) | 44.68 |
| Laponite (synthetic hectorite) | 2.00 |
| Glycerine | 26.10 |
| Deionized water | 3.00 |
| Syloid 244 (thickener) | 5.00 |
| Sodium N-lauryl sarcosinate | 2.00 |
| Saccharin, sodium | 0.17 |
| Sodium aluminum silicate | 16.00 |
| Flavor | 1.00 |

The speckles of Examples 13 and 14 are also employed in this example.

EXAMPLE 15a

Examples 14 and 15 are repeated except that in each instance 1 part of chloroform is added to the formulation for flavoring.

EXAMPLE 16

Speckles having the composition of those of Examples 1 to 5 are prepared by a spray cooling process wherein the composition is sprayed into a tower and therein contacted with concurrent cool gases. The solidified particles are screened similarly as the roll mill produced speckles. When used in toothpastes as described for example, in Examples 6–15 similar excellent products are produced. It is, of course clear that the speckles of this invention can be used having a wider or narrower particle size distribution and range than herein specifically produced if one desires.

EXAMPLE 17

Examples 13, 14 and 15 are repeated except that there is present in the toothpaste 0.5% allantoin in place of an equal amount of water.

EXAMPLE 18

Example 4 H is repeated using Pigment Green 7 (Color Index No. 74260) and the speckles are then incorporated into the toothpaste formulations of Examples 13, 14, 15 and 17.

EXAMPLE 19

Examples 13, 14 and 15 are again repeated except that 0.3% titanium dioxide is present in the toothpaste in place of an equal amount of water.

EXAMPLE 20

Example 4 is repeated except that along with the pigment there is used 5% allantoin in each case.

EXAMPLE 21

Example 4 is repeated using 16% of a silica xerogel, commercially known as Syloid 74, in place of the sodium aluminum silicate polishing agent.

While the pigment particles have been described herein with an upper limit of particle size, it is clear that the lower limit is not critical approaching colloidal or molecular size. For practical purposes a lower limit of 0.01 microns, average size, is suggested.

We claim:

1. An oral preparation comprising from about 0.05 to 10% by weight of finely divided particles of a $C_{12}$ to $C_{22}$ saturated fatty acid ester selected from the group consisting of di- and tri-esters of a compound selected from the group consisting of glycerol and ethylene glycol said particles having a macroscopic particle size within the range of 100 to 1000 microns and containing from 0.01 to 99% of a dentifrice additive.

2. A preparation as defined in claim 1 which is a toothpaste.

3. A preparation as defined in claim 1 which is an opaque translucent or transparent toothpaste.

4. An oral preparation as defined in claim 1 wherein said dentifrice additive is a functional additive.

5. An oral preparation as defined in claim 4 wherein said additive is a polishing agent.

6. An oral preparation as defined in claim 4 wherein said additive is titanium dioxide.

7. An oral preparation as defined in claim 4 wherein said additive is a fluoride.

8. An oral preparation as defined in claim 1 wherein said dentifrice additive is a non-functional additive.

9. An oral preparation as defined in claim 8 wherein said additive is a coloring additive which is present in amount of 0.01 to 10% by weight of said particles.

10. An oral preparation as defined in claim 9 wherein said coloring additive is a pigment having an average size of less than 2 microns.

11. An oral preparation as defined in claim 9 wherein the ester is glyceryl tristearate.

* * * * *

UNITED STATES PATENT AND TRADEMARK OFFICE
CERTIFICATE OF CORRECTION

PATENT NO. : 3,919,409
DATED : November 11, 1975
INVENTOR(S) : Giulio Perla and Giuseppe Mannara It is certified that error appears in the above-identified patent and that said Letters Patent are hereby corrected as shown below:

Column 3, line 49, cancel "allanboin" and insert --allantoin--.

Column 4, line 7, cancel "sodium".

Column 5, line 33, cancel "Zircons" and insert --Zirconium--.

Column 8, line 28, cancel "4" after "Example" and insert --14--.

Signed and Sealed this

Fifth Day of April 1977

[SEAL]

Attest:

RUTH C. MASON
Attesting Officer

C. MARSHALL DANN
Commissioner of Patents and Trademarks